United States Patent
Mori

(10) Patent No.: US 7,107,841 B2
(45) Date of Patent: Sep. 19, 2006

(54) CAPACITANCE-SENSING VIBRATORY GYRO AND METHOD FOR DETECTING CHANGE IN CAPACITANCE

(75) Inventor: Akira Mori, Nagaokakyo (JP)

(73) Assignee: Murata Manufacturing Co., Ltd., Kyoto-Fu (JP)

(*) Notice: Subject to any disclaimer, the term of this patent is extended or adjusted under 35 U.S.C. 154(b) by 268 days.

(21) Appl. No.: 10/752,547

(22) Filed: Jan. 8, 2004

(65) Prior Publication Data

US 2004/0196617 A1 Oct. 7, 2004

(30) Foreign Application Priority Data

Apr. 7, 2003 (JP) .............. 2003-102476

(51) Int. Cl.
*G01P 9/04* (2006.01)
(52) U.S. Cl. .................................. 73/504.12
(58) Field of Classification Search ............ 73/504.12, 73/504.14, 504.15, 504.16
See application file for complete search history.

(56) References Cited

U.S. PATENT DOCUMENTS 6,526,826 B1* 3/2003 Kurachi et al. .......... 73/504.14
6,584,841 B1* 7/2003 Ichinose et al. ......... 73/504.12
6,972,619 B1* 12/2005 Sato et al. ............... 73/504.16

FOREIGN PATENT DOCUMENTS

JP    11-044540     2/1999
JP    2001-153659   6/2001

OTHER PUBLICATIONS

Official Communication dated Nov. 18, 2005, issued in the corresponding Korean Patent Application No. 10-2004-0019666. (With full English translation).

* cited by examiner

Primary Examiner—John E. Chapman

(57) ABSTRACT

A capacitance-sensing vibratory gyro includes a capacitance-sensing circuit that detects changes in capacitances of a sensing element. The capacitance-sensing circuit includes two operational amplifiers. The inverting input terminal of each operational amplifier is connected to the corresponding sensing electrode in the sensing element. A bias voltage generated by dividing a power supply voltage with resistors is applied to the non-inverting input terminals of the operational amplifiers. The bias voltage is applied to each sensing electrode by imaginary short-circuiting in the operational amplifiers so that the bias voltage directly depends on the power supply voltage.

15 Claims, 2 Drawing Sheets

CAPACITANCE-SENSING VIBRATORY GYRO AND METHOD FOR DETECTING CHANGE IN CAPACITANCE

BACKGROUND OF THE INVENTION

1. Field of the Invention

The present invention relates to a capacitance-sensing vibratory gyro and a method for detecting changes in a capacitance.

2. Description of the Related Art

In general, in the case where a vibratory gyro is used as a sensor for detecting a camera vibration or shaking during hand-held shooting or a position of a motor vehicle by an angular velocity, an analog output signal from the sensor is converted into a digital signal by an A/D converter and then a predetermined correction process is carried out based on the signal.

In this case, in an A/D converter with a voltage comparator, since the reference voltage level for the conversion sometimes depends on a power supply voltage level, detection sensitivity of the sensor must depend on the power supply voltage level to improve the detection accuracy.

For this purpose, in a known art, the amplitude of the signal for driving a vibrator, which is a sensor, is varied depending on the power supply voltage level, thereby changing the output level of the sense signal from the vibrator. As a result, the detection sensitivity of the sensor depends on the power supply voltage level to improve the detection accuracy (refer to, for example, Japanese Unexamined Patent Application Publication No. 11-44540, in particular, pages 1 to 3 and FIG. 1).

Unfortunately, in the known art as disclosed in the above-described patent document, during a time period from applying a driving signal dependent upon the power supply voltage to the vibrator to receiving a required sense signal from the vibrator, many conversions, electrical to mechanical and vice versa, are required. These conversions accumulate conversion errors such that sufficient accuracy to precisely follow the change of the power supply voltage level cannot be obtained.

SUMMARY OF THE INVENTION

In order to overcome the problems described above, preferred embodiments of the present invention provide a capacitance-sensing vibratory gyro having improved accuracy to precisely follow a change of a power supply voltage level, and a method for detecting changes in a capacitance.

According to a first preferred embodiment of the present invention, a capacitance-sensing vibratory gyro includes a sensing element including a sensing electrode and a reference electrode, the sensing element changing a capacitance between the sensing electrode and the reference electrode caused by an angular velocity, and a capacitance-sensing circuit detecting the change in the capacitance of the sensing element, wherein a detecting bias voltage in the capacitance-sensing circuit depends on a power supply voltage. Consequently, the sensitivity of the sensing element depends on the power supply voltage.

Preferably, in the capacitance-sensing vibratory gyro, a bias voltage applied to the sensing electrode of the sensing element depends on the power supply voltage. Compared with a configuration in which amplitude of a signal for driving the sensing element depends on the power supply voltage level, this configuration eliminates electrical to mechanical conversions, thus greatly improving the detection accuracy.

Preferably, the capacitance-sensing vibratory gyro further includes an operational amplifier, wherein an inverting input terminal of the operational amplifier is connected to the sensing electrode, an output terminal of the operational amplifier is connected with the inverting input terminal through a feedback resistor, the bias voltage is generated by dividing the power supply voltage with resistors and is applied to a non-inverting input terminal, and the bias voltage is applied to the corresponding sensing electrode by imaginary short-circuiting in the operational amplifier. This configuration is not affected by initial capacitances or impedances of the sensing element, thus suppressing variance of the sensitivity.

Preferably, in the capacitance-sensing vibratory gyro, the bias voltage generated by dividing the power supply voltage with resistors is applied to the sensing electrode through a capacitance-sensing resistor.

According to a second preferred embodiment of the present invention, in a method for detecting a change in a capacitance of a capacitance-sensing vibratory gyro, wherein, when a capacitance-sensing circuit detects the change in the capacitance between a sensing electrode and a reference electrode of a sensing element caused by an angular velocity, the sensitivity of the sensing element depends on a power supply voltage by a detecting bias voltage in the capacitance-sensing circuit depending on the power supply voltage.

Other features, elements, characteristics and advantages of the present invention will become more apparent form the following detailed description of preferred embodiments with reference to the attached drawings.

DETAILED DESCRIPTION OF PREFERRED EMBODIMENTS

Figure 1:
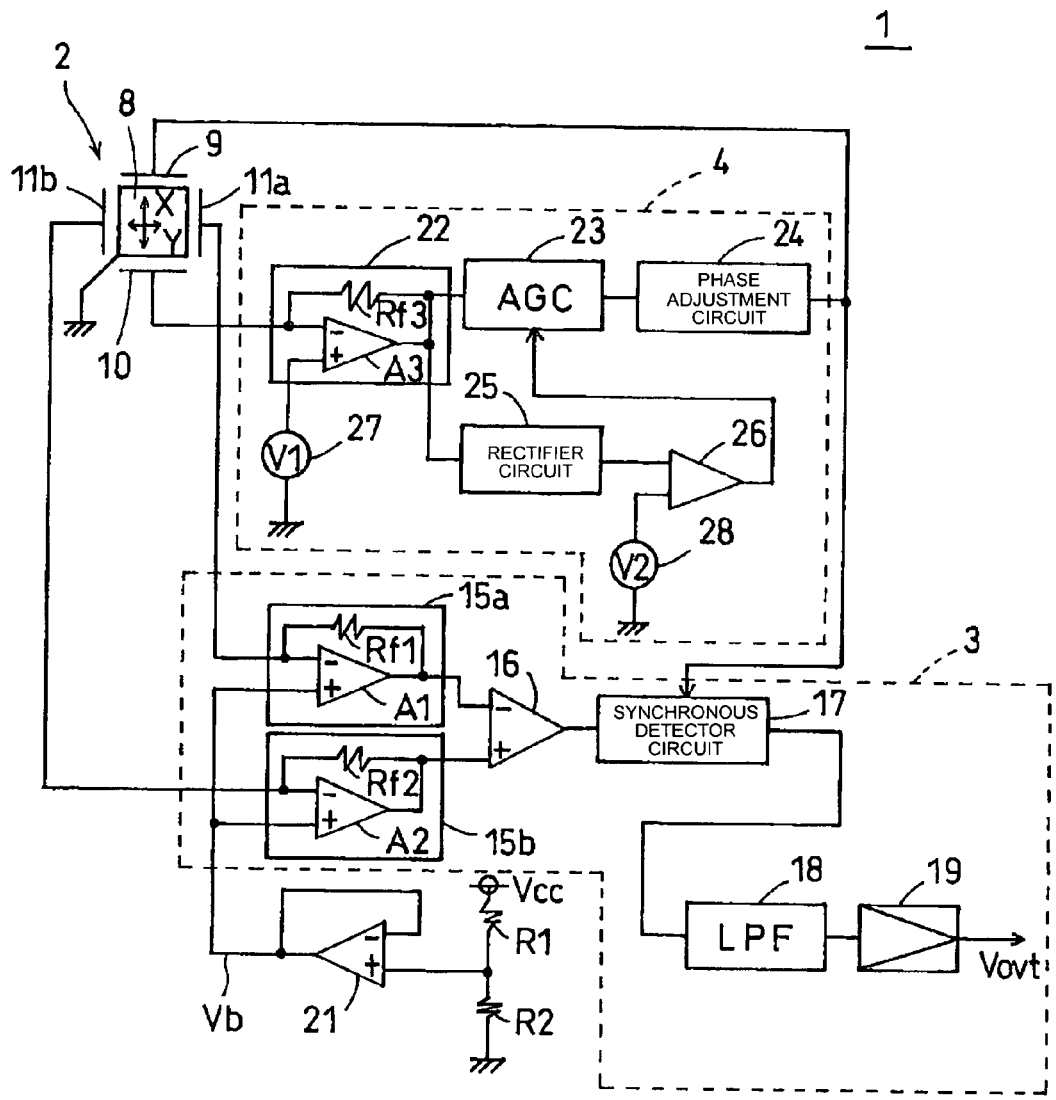
FIG. 1 is a circuit diagram showing a configuration of a capacitance-sensing vibratory gyro according to a preferred embodiment of the present invention.

FIG. 1 is a circuit diagram showing a configuration of a capacitance-sensing vibratory gyro according to a preferred embodiment of the present invention.

The capacitance-sensing vibratory gyro 1 according to the present preferred embodiment includes a sensing element 2 having a capacitance between a sensing electrode and a reference electrode that varies in accordance with an applied angular velocity, a capacitance-sensing circuit 3 that detects the changes in the capacitances of the sensing element 2, and a driving circuit 4 that drives the sensing element 2.

The sensing element 2 includes a vibrator 8 supported displaceably in the mutually perpendicular X-axis and Y-axis directions on a Si substrate. Also included are a driving electrode 9 that drives the vibrator 8 in the X-axis direction, a monitor electrode 10 that monitors the vibration of the vibrator 8 in the X-axis direction, and a pair of sensing electrodes 11a and 11b that detect capacitance changes caused by the displacement of the vibrator 8 in the Y-axis direction by a Coriolis force which arises in response to an angular velocity about the Z-axis, which is substantially perpendicular to the substrate. In this case, the vibrator 8 is electrically connected to ground and becomes a reference electrode. In fact, the overall structure of the sensing element 2 is known in, for example, Japanese Unexamined Patent Application Publication No. 2001-153659.

The driving circuit 4 is a sort of free-running oscillator and includes a C/V converter 22, an AGC (automatic gain control) circuit 23, a phase adjustment circuit 24, a rectifier circuit 25, and a comparator 26. The C/V converter 22 includes an operational amplifier A3. An inverting input terminal of the operational amplifier A3 is connected to a monitor electrode 10 in the sensing element 2. An output terminal and the inverting input terminal are connected through a feedback resistor Rf3. A bias voltage V1 is applied to a non-inverting input terminal. The bias voltage V1 is supplied from a stabilized power supply 27, such as a DC/DC converter, which stabilizes a power supply voltage Vcc. Similarly, a reference voltage V2 for the comparator 26 is supplied from a stabilized power supply 28, which stabilizes the power supply voltage Vcc.

In the above-described configuration, a monitor signal output from the monitoring C/V converter 22 is applied to the automatic gain control circuit 23. Concurrently, the monitor signal is smoothed by the rectifier circuit 25 and is compared with the reference voltage V2 by the comparator 26. The comparator 26 outputs a gain control signal to the automatic gain control circuit 23 so that the amplitude of the monitor signal is adjusted to maintain a constant displacement of the sensing element 2 in the X-axis direction all the time. Subsequently, the monitor signal is phase-adjusted by the phase adjustment circuit 24 to generate an alternating driving signal. This alternating driving signal then is supplied to the sensing element 2. The driving signal to the driving electrode 9 in the sensing element 2 vibrates the sensing element 2 in the X-axis direction.

The capacitance-sensing circuit 3 includes a pair of C/V converters 15*a* and 15*b*, a differential amplifier 16, a synchronous detector circuit 17, a low-pass filter 18, and an amplifier 19. The C/V converters 15*a* and 15*b* have operational amplifiers A1 and A2, respectively. Inverting input terminals of the operational amplifiers A1 and A2 are connected to sensing electrodes 11*a* and 11*b*, respectively. The output terminals are connected to the respective inverting input terminals through feedback resistors Rf1 and Rf2. A common bias voltage Vb is applied to the non-inverting input terminals.

Thus, in this preferred embodiment, the power supply voltage Vcc is divided into two voltages by resistors R1 and R2. One voltage, which is the bias voltage Vb, is applied to the non-inverting input terminals of the operational amplifiers A1 and A2 in the capacitance-sensing circuit 3 through a buffer amplifier 21. Accordingly, direct current voltages having the same potential as that of the bias voltage Vb appear in the inverting input terminals of the operational amplifiers A1 and A2 by imaginary short-circuiting of the operational amplifiers A1 and A2. The voltages are applied to the sensing electrodes 11*a* and 11*b* in the sensing element 2.

Accordingly, the bias voltage Vb applied to the sensing electrodes 11*a* and 11*b* depends on the power supply voltage Vcc. By applying the direct current voltage that is the same as the bias voltage Vb to the sensing electrodes 11*a* and 11*b* in the sensing element 2, electric charges are retained in the sensing electrodes 11*a* and 11*b*.

An angular velocity about the Z-axis which is substantially perpendicular to the substrate, with the sensing element 2 vibrating along the X-axis direction, generates the Coriolis force in the Y-axis direction, which is substantially perpendicular to the vibrating direction of the sensing element 2, namely, the X-axis direction. The Coriolis force vibrates the sensing element 2 in the Y-axis direction, thus reciprocally changing the capacitances of the sensing electrodes 11*a* and 11*b*.

In other words, direct current voltages having the same potential as that of the bias voltage Vb, which are applied to the non-inverting input terminals of the operational amplifiers A1 and A2, are applied to the sensing electrodes 11*a* and 11*b* in the sensing element 2 by imaginary short-circuiting of the operational amplifiers A1 and A2 included in the C/V converters 15*a* and 15*b*, so that electric charges Q are retained in the sensing electrodes 11*a* and 11*b*. In this condition, vibration of the sensing element 2 in the Y-axis direction caused by the Coriolis force changes the capacitances of the sensing electrodes 11*a* and 11*b*. As the capacitance of the sensing electrode 11*a* increases, the capacitance of the sensing electrode 11*b* decreases. Conversely, as the capacitance of the sensing electrode 11*a* decreases, the capacitance of the sensing electrode 11*b* increases. These capacitance changes in the sensing electrodes 11*a* and 11*b* are converted to voltage signals by the C/V converters 15*a* and 15*b*.

The variation $\Delta Vo$ of the voltage signal output from each C/V converter 15*a* or 15*b* is given by the following equation (1):

$$\Delta Vo = \omega \cdot \Delta C \cdot Vb \cdot Zf \quad (1)$$

where $\omega$ is the angular frequency of the sensing element 2 in a vibration state, $\Delta C$ is a variation in the capacitance caused by the Coriolis force, Vb is the bias voltage, and Zf is a feedback impedance in the operational amplifier A1 or A2, in this case, a resistance of the feedback resistor Rf1 or Rf2.

As seen in the above-described equation (1), the C/V converters 15*a* and 15*b* convert variations $\Delta C$ in the capacitances caused by the Coriolis force into variations $\Delta Vo$ in voltages. In addition, since the bias voltage Vb that is applied to both sensing electrodes 11*a* and 11*b* depends on the power supply voltage Vcc, the variations $\Delta Vo$ in the sensing outputs of the C/V converters 15*a* and 15*b* can also depend on the power supply voltage Vcc. That is, the detecting sensitivity of the Coriolis force can depend on the power supply voltage Vcc.

In this case, compared to a known technology in which a driving signal to the sensing element 2 depends on the power supply voltage, an electrical-to-mechanical conversion is eliminated. As a result, the change in the power supply voltage Vcc directly becomes the change in the sensing signal $\Delta Vo$, thus greatly improving the accuracy to precisely follow the power supply voltage.

The voltage signals converted by the C/V converters 15*a* and 15*b* are supplied to the differential amplifier 16. The differential amplifier 16 generates the difference between the signals. Consequently, the output of the differential amplifier 16 is 2$\Delta Vo$. The output of the differential amplifier 16 then is detected by the synchronous detector circuit 17 in synchronization with the driving frequency of the driving signal and passed to the low-pass filter 18. Finally, a direct current voltage having the value in accordance with the angular velocity is generated through the low-pass filter 18 and the amplifier 19.

Figure 2:
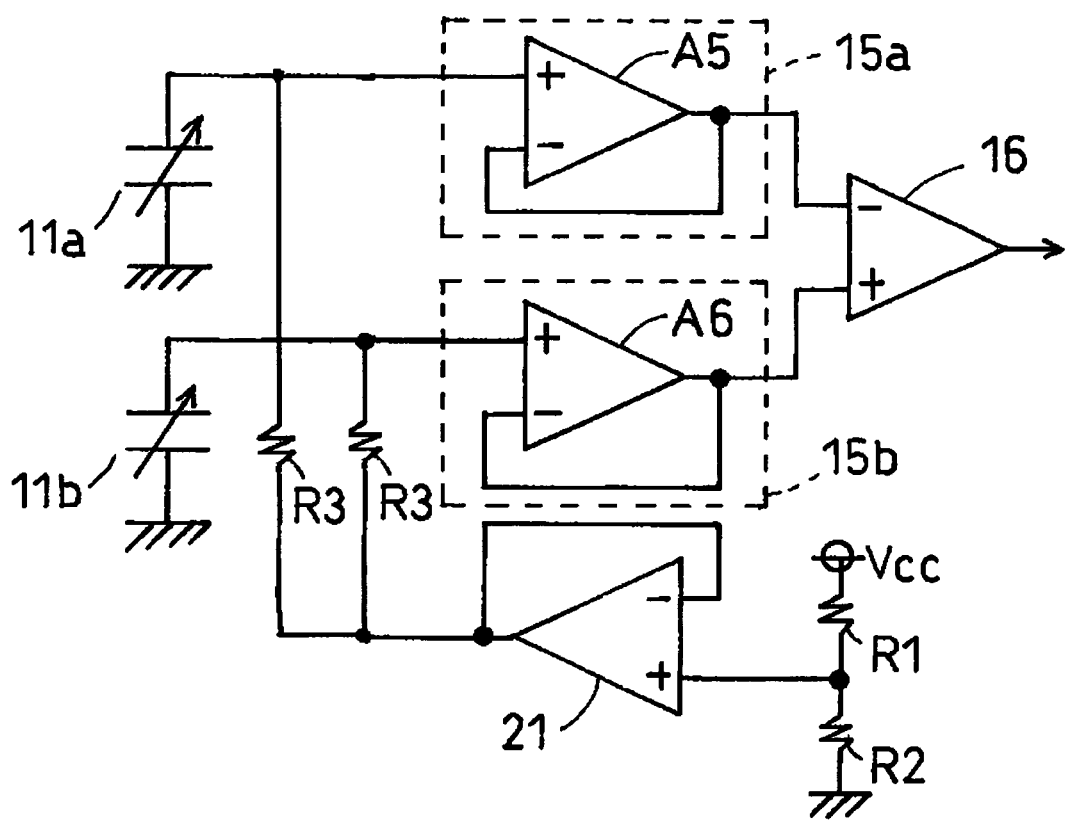
FIG. 2 is a circuit diagram showing a modification of a capacitance-sensing circuit included in the capacitance-sensing vibratory gyro according to another preferred embodiment of the present invention.

In this preferred embodiment, in the operational amplifiers A1 and A2, which constitute the C/V converters 15*a* and 15b in the capacitance-sensing circuit 3, the bias voltage Vb is applied to the sensing electrodes 11a and 11b in the sensing element 2 by imaginary short-circuiting, which is a characteristic of a non-inverting amplifier. However, the present invention is not limited thereto. It may be applied to a configuration shown in FIG. 2.

That is, the C/V converters 15a and 15b, which are connected to the sensing electrodes 11a and 11b in the sensing element 2 shown in FIG. 1, are constructed from buffer amplifiers A5 and A6. A bias voltage Vb generated by dividing the power supply voltage Vcc by the resistors R1 and R2 is applied to the sensing electrodes 11a and 11b through capacitance-sensing resistors R3.

When R3>>1(ω/C), the variation ΔVo of the voltage signal from the C/V converter 15a or 15b is given by the following equation (2):

$$\Delta Vo = (\Delta C / C + \Delta C) \cdot Vb \quad (2)$$

where C is a capacitance of the sensing electrodes 11a or 11b, ΔC is a variation in the capacitance caused by the Coriolis force, Vb is a bias voltage, and R3 is a resistance of the capacitance-sensing resistors R3.

As seen in the above-described equation (2), the C/V converters 15a and 15b also convert variations ΔC in the capacitances caused by the Coriolis force into variations ΔVo in voltages. In addition, since the bias voltage Vb that is applied to the sensing electrodes 11a and 11b depends on the power supply voltage Vcc, the variations ΔVo, which are sensing outputs of the C/V converters 15a and 15b, can also depend on the power supply voltage Vcc. That is, the detecting sensitivity of the Coriolis force can depend on the power supply voltage Vcc.

The capacitance-sensing vibratory gyro and the method for detecting the changes in the capacitances according to the present invention is not limited the above-described preferred embodiments in which the sensing element is disposed on the Si substrate. The present invention may be applied to other configurations of the capacitance-sensing elements.

The present invention is not limited to each of the above-described preferred embodiments, and various modifications are possible within the range described in the claims. An embodiment obtained by appropriately combining technical features disclosed in each of the different preferred embodiments is included in the technical scope of the present invention.

What is claimed is:

1. A capacitance-sensing vibratory gyro comprising:
   a sensing element including at least one sensing electrode and a reference electrode, the sensing element changing a capacitance between the at least one sensing electrode and the reference electrode caused by an angular velocity;
   a capacitance-sensing circuit detecting the change in the capacitance of the sensing element;
   a power supply voltage source;
   at least two resistors connected to said power supply voltage source; and
   a buffer amplifier arranged to supply a bias voltage that is applied to the at least one sensing electrode and a detecting bias voltage in the capacitance-sensing circuit; wherein
   the detecting bias voltage in the capacitance-sensing circuit varies in accordance with a power supply voltage supplied by the power supply voltage source.

2. A capacitance-sensing vibratory gyro according to claim 1, wherein the bias voltage applied to the at least one sensing electrode of the sensing element varies in accordance with the power supply voltage.

3. A capacitance-sensing vibratory gyro according to claim 2, further comprising an operational amplifier having an inverting input terminal, a non-inverting input terminal and an output terminal, wherein the inverting input terminal of the operational amplifier is connected to the at least one sensing electrode, the output terminal of the operational amplifier is connected with the inverting input terminal through a feedback resistor, the bias voltage applied to the at least one sensing electrode is generated by dividing the power supply voltage with resistors and is applied to the non-inverting input terminal, and the bias voltage is applied to the at least one sensing electrode by imaginary short-circuiting in the operational amplifier.

4. A capacitance-sensing vibratory gyro according to claim 2, wherein the bias voltage applied to the at least one sensing electrode is generated by dividing the power supply voltage with the at least two resistors and is applied to the at least one sensing electrode through a capacitance-sensing resistor.

5. A capacitance-sensing vibratory gyro according to claim 1, wherein the sensing element includes a substrate and a vibrator supported displaceably in mutually perpendicular X-axis and Y-axis directions on the substrate.

6. A capacitance-sensing vibratory gyro according to claim 5, wherein the substrate is made of Si.

7. A capacitance-sensing vibratory gyro according to claim 5, wherein the sensing element includes a driving electrode that drives the vibrator in the X-axis direction, a monitor electrode that monitors the vibration of the vibrator in the X-axis direction, and the at least one sensing electrode comprises a pair of sensing electrodes that detect capacitance changes caused by the displacement of the vibrator in the Y-axis direction by a Coriolis force caused by an angular velocity about the Z-axis.

8. A capacitance-sensing vibratory gyro according to claim 7, further comprising a driving circuit including a C/V converter, an automatic gain control circuit, a phase adjustment circuit, a rectifier circuit, and a comparator.

9. A capacitance-sensing vibratory gyro according to claim 8, wherein the C/V converter includes an operational amplifier having an inverting input terminal connected to the monitor electrode of the sensing element, an output terminal and a inverting input terminal connected through a feedback resistor.

10. A capacitance-sensing vibratory gyro according to claim 1, wherein the capacitance-sensing circuit includes a pair of C/V converters, a differential amplifier connected to the pair of C/V converters, a synchronous detector circuit connected to the differential amplifier, a low-pass filter connected to the synchronous detector circuit, and an amplifier connected to the low-pass filter.

11. A capacitance-sensing vibratory gyro according to claim 10. wherein the pair of C/V converters include operational amplifiers.

12. A capacitance-sensing vibratory gyro according to claim 10, wherein the pair of C/V converters include buffer amplifiers.

13. A capacitance-sensing vibratory gyro according to claim 10, wherein the at least one sensing electrode comprises a pair of sensing electrodes, and the C/V converters have operational amplifiers including inverting input terminals connected to the pair of sensing electrodes.

14. A capacitance-sensing vibratory gyro according to claim 1, wherein the at least two resistors are arranged to divide the power supply voltage into two voltages, one of which is the bias voltage applied to the at least one sensing electrode of the sensing element.

15. A method for detecting a change in a capacitance of a capacitance-sensing vibratory gyro comprising the steps of:

providing a sensing element including at least one sensing electrode and a reference electrode, the sensing element changing a capacitance between the sensing electrode and the reference electrode caused by an angular velocity;

providing a capacitance-sensing circuit arrange to detect the change in the capacitance of the sensing element;

providing a power supply voltage source;

connecting a pair of resistors to said power supply voltage source;

providing a buffer amplifier arranged to supply a bias voltage that is applied to the sensing electrode and a detecting bias voltage in the capacitance-sensing circuit;

detecting a change in the capacitance between the sensing electrode and the reference electrode of the sensing element caused by the angular velocity using the capacitance-sensing circuit ; and varying the sensitivity of the sensing element by varying the detecting bias voltage in the capacitance-sensing circuit in accordance with the power supply voltage.

* * * * *